United States Patent Office 3,120,438
Patented Feb. 4, 1964

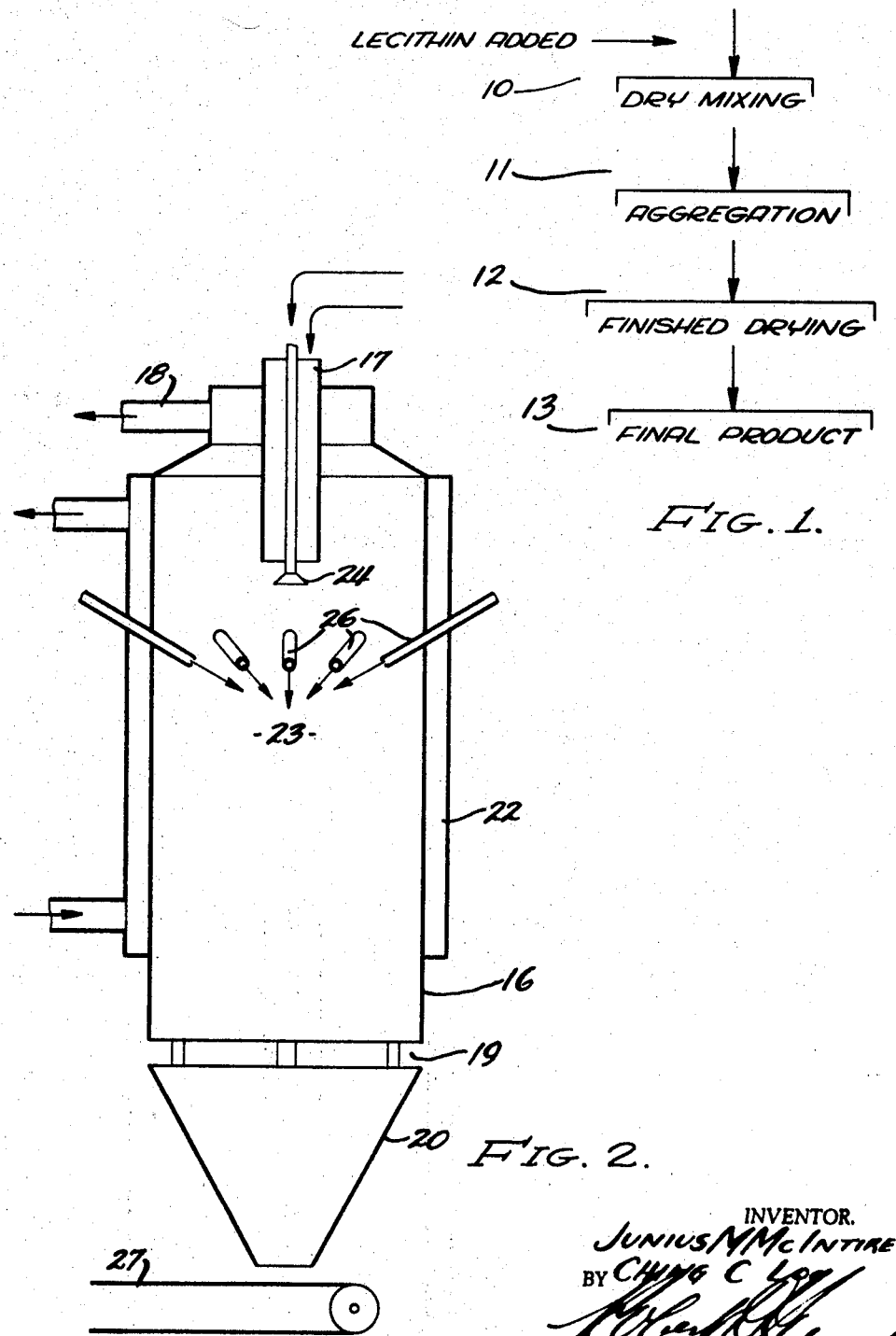

3,120,438
FAT-CONTAINING DRIED DAIRY PRODUCT AND METHOD OF MANUFACTURE
Junius M. McIntire, Van Nuys, and Ching C. Loo, Sepulveda, Calif., assignors, by mesne assignments, to Dairy Foods Incorporated, Los Angeles, Calif., a corporation of California
Filed Nov. 3, 1958, Ser. No. 771,472
1 Claim. (Cl. 99—56)

The present invention relates generally to a process for manufacturing fat-containing dried dairy products, and more specifically, to a process entailing the step of blending or dry mixing lecithin with or applying lecithin to the individual particles of a conventionally spray dried dairy product and then reprocessing such dairy product so as to form porous aggregates of random size and shape.

In U.S. Patent No. 2,835,586 entitled "Dried Milk Product and Method of Making Same" in the name of David D. Peebles and dated May 20, 1958, a process is disclosed for manufacturing a dried milk product comprising porous aggregates which can be readily and completely dispersed in water without agitation to form a stable reconstituted milk. The application of the principles of invention set forth in this patent in the manufacture of an aggregated fat-containing dried dairy product such as for example, dried whole milk, results in a product vastly improved in wettability and ease of dispersibility as compared to a conventional or non-aggregated dried whole milk. Applicants have found, however, that the ease of dispersibility and wettability of an aggregated fat-containing product such as for example, dried whole milk, can be greatly improved through the proper use and application of lecithin in the processing.

More specifically, it has been found that a mixture of lecithin with fluid milk and the subsequent spray drying and re-processing in a manner so as to form an aggregated final product does not produce any unexpected results. In other words, this product has not been enhanced with respect to wettability or dispersibility as compared to any normally aggregated dried fat-containing milk product.

When lecithin, however, is blended with the dried fat-containing dairy product, either by physically dry blending the two ingredients, or by spraying lecithin on the individual particles of the starting material, and the starting material is subsequently re-processed in a manner so as to form an aggregated final product, the resulting aggregated product, as far as ease of dispersibility and wettability are concerned, is substantially improved without any detrimental effects being imparted to the flavor constituents of the product.

In general, therefore, it is the primary object of the present invention to provide a product having the desirable characteristics described above.

A further object of the present invention is to provide a fat-containing dried dairy product which is characterized by its ability to be readily and quickly dispersed in water without vigorous agitation to form a stable reconstituted dairy beverage.

A still further object of the present invention is to provide a process for converting ordinary dried fat-containing dairy product into a powder which can be easily and quickly dispersed in water to form a stable reconstituted dairy beverage.

Yet another object of the present invention is to provide a process entailing the blending of the dried starting material with a predetermined amount of lecithin prior to re-processing so as to form a product which is in the form of random-shaped, porous aggregates characterized by their ease of wettability and dispersibility and which, when reconstituted, form a stable dairy beverage.

Other objects and advantages of the present invention will be apparent to those skilled in the art upon perusal of the following description and drawings wherein:

FIG. 1 is a flow sheet illustrating the method for manufacturing this novel fat-containing dried dairy product.

FIG. 2 is a schematic view illustrating suitable apparatus for effecting the aggregation of the product.

It is recognized that the emulsifying properties of lecithin are well-known and that these emulsifying properties have been responsible for its use in the past in connection with dried dairy products so as to enhance the degree of wettability of these products. For example, in U.S. Patent No. 2,399,565, in the name of Gerald C. North and Alvin J. Alton and entitled "Dairy Product" it is disclosed that the addition of between 0.25% and 2% based on the weight of the dried product in the case of powdered milk, and 0.50% and 3% based on the weight of the dried product in the case of powdered cream, in the lacteal fluid in any suitable manner, for instance, by mechanical means such as homogenization, and then the subsequent spray drying of this homogenized mass, results in a dairy product having lecithin dispersed and dissolved in the butterfat particles, and the resulting product is claimed to have improved miscibility, solubility, flavor and keeping qualities. There are further publications to the effect that it is old to add or coat lecithin, or any unctuous material for that matter, upon the outer surface of the individual particles of a spray dried fat-containing dairy product, and that this addition tends to improve the wettability of the resulting product. It is submitted, however, that any improvement with respect to wettability, miscibility, dispersibility, solubility, etc. is always relatve, and in none of the methods and/or processes described in these prior publications is the final product wettable and dispersible to the extent and to the degree that the final product could be called "instant" in the sense that term is used today.

In contrast, applicants' product, and referring specifically in this instance to dried whole milk powder, can be reconstituted with simple stirring to form a stable dairy beverage in on or about 5 seconds whereas a conventionally spray dried whole milk power is incapable of being completely reconstituted by simple stirring.

In accordance with the present invention, any fat-containing dried dairy product such as for example, powdered whole milk, powdered milk-skim milk mixtures, powdered cream, powdered milk-cream mixtures, malted milk, powdered ice cream mixes, and any related type products, flavored or non-flavored, can be manufactured and the fianl products in each instance are characterized by their high degree of wettability and dispersibility in cold water.

The principles of the present invention in general entail the dry blending with a pre-determined amount of lecithin which will be in a range of from 0.2% to 1.5% by weight until the resulting product is a thorough intermixture of these two ingredients. This step is indicated as 10 in FIG. 1. The resulting dry mixture is then delivered at 11 to certain treatment apparatus wherein it is processed by an "instantizing" treatment in which the individual particles of the dry mixture are moistened and caused to adhere together in random fashion in the form of aggregates. The aggregates are then subjected to drying to adjust the moisture content at 12 and the final product 13 is produced which is characterized by the above referred-to advantages.

Referring now more specifically to the manufacture of a particular product, say for example, powdered whole milk, the powdered whole milk starting material is dry blended at 10 with from 0.1% to 1.5% by weight of lecithin, 0.5% by weight being deemed optimum. This dry blending can be accomplished mechanically by any suitable blending apparatus or the lecithin can be heated to an extent sufficient to reduce its viscosity and then sprayed or pumped through a nozzle upon the starting powder. After the lecithin is either added or sprayed upon the starting powder, the resulting mixture is agitated or blended sufficiently to effect a thorough intermixture. The mixture from step 10 is then introduced to the instantizing or conversion step 11 wherein the individual particles of the dried whole milk powder are bonded together in the form of random aggregates. As will be presently explained, this instantizing operation is effected by passing the mixture through a treatment zone wherein the particles are moistened to an extent sufficient to render their surfaces sticky and adhesive. In step 12, the moist aggregates are subjected to hot drying air or gases so that the final product 13 has a pre-determined moisture content, and the finished drying operation is so calculated and performed as not to disturb the bond between the individual particles making up the aggregates.

A suitable apparatus for effecting the instantizing of the dry mixture into aggregates is disclosed in FIG. 2. This apparatus is similar to that disclosed in the above-identified U.S. Letters Patent No. 2,835,586. This apparatus consists of a vertical chamber 16 having a downwardly extending inlet conduit 17 for receiving the starting mass as conveyed pneumatically from a suitable supply hopper. Some air is removed from chamber 16 through a conduit 18 whereby air is drawn into the chamber through an opening 19 between the main part of chamber 16 and a discharge cone 20. The sides of chamber 16 can be kept at a pre-determined temperature by circulating warm air through a jacket 22 thereby preventing the condensing of moisture on the inner surface of chamber 16. The free-falling powder passes through a treatment zone 23 where it is commingled with finely atomized water discharged from a nozzle 24 and/or saturated steam which is introduced by the way of a plurality of nozzles 26. The free-falling mass acquires sufficient moisture in passing through the treatment zone 23 to become sticky and tacky and is caused to adhere together in the form of random shaped aggregates of random size. The aggregated material is discharged through the cone 20 upon a lower conveyer 27, and at this stage, the moisture content of the aggregated product is such that it can not be easily handled. The speed of the belt 27 is calculated that by the time the product reaches suitable drying apparatus it has become sufficiently firm for easy handling, and it is then subjected to the drying gases or air for finished drying to produce a final product having a pre-determined total moisture content.

A specific procedure for manufacturing an aggregated dried whole milk with added lecithin could be as follows:

*Method A*

150 lbs. of spray dried whole milk powder is placed in a ribbon blender. While this product is being agitated by the blender, ¾ lb. of commercial lecithin is sprayed into the powder by means of a suitable spray gun or a high pressure pump and nozzles. In order to permit the lecithin to be sprayed or pumped as above indicated, it should be heated to on or about 140° F. to reduce its viscosity. If necessary it can be thinned with up to 30% corn oil in order to get the viscosity necessary.

After the lecithin is sprayed into the powder, the agitation of the powder is continued for on or about 20 minutes at which time 3 lbs. of lactose may be added. The resulting mixture is then agitated in the blender for an additional 5 or so minutes.

*Method B*

¾ lb. of lecithin and on or about 10 lbs. of spray dried whole milk powder are mixed together by kneading the mass with a "slick" until the mixture appears to be completely homogeneous. This "pre-mix" is then added to 15 lbs. of whole milk powder in a Hobart blender and the resulting mix is blended until it is smooth and lump-free. This will take from on or about 15 to 20 minutes. The resulting mixture is then added to 125 lbs. of whole milk powder and blended in a ribbon blender for on or about 20 minutes. 3 lbs. of lactose can be added and this resulting mixture is blended in the ribbon blender for an additional 5 minutes.

The resulting dry mixture prepared in accordance with either Method A or Method B above, is then processed in the instantizing apparatus disclosed in FIG. 2 and the rate of moisture addition either from nozzle 24 and/or steam nozzle 26 and the rate of feed through conduit 17 are so calculated that the product passing through the chamber 16 upon the belt 27 has a total moisture content of on or about 10% to 12%. The air temperature at the treatment zone is maintained at approximately 90° F. and the belt 27 is run at such a speed that it takes approximately 35 seconds for the aggregated material to be delivered to the drying apparatus.

While any suitable apparatus or procedures can be used for removing the excess moisture from the aggregated material, it is desirable to avoid mechanical handling to such an extent that the final product will be ground or crushed. It is also necessary that no substantial increase in the amount of insoluble material occurs in the processing such as for example, coagulated protein. Assuming that the product is dried in contact with air, which of course, is preferable, the temperature of the dry air can be of the order of from 180° F. to 270° F. The temperature levels and the periods of drying can be varied but should be controlled to avoid the creation of undesirable amounts of insoluble material and the development or creation of off-flavors due to overheating. The final product should have a moisture content of less than 2.5%.

A highly desirable drying procedure is to convey the moist aggregated material over a screen provided with a plurality of perforations. This screen is vibrated to cause the material to move in one direction along the length of the screen while at the same time applying a vertical motion to maintain the powder as a loose apron or layer. Warm dry air is directed upwardly through the screen, and the vibratory motion is so calculated in relation to the rate of air being directed through the screen as to cause the product to fluff and to form a layer several times the thickness it would normally have if at rest. By this technique, the product is caused to progress along the screen and is at least partially supported by that portion of air being intermingled therewith. It is found preferable to employ two screens of this type in combination, and in the first screen the drying air should be on or about 270° F., and in the second screen the drying air should be on ar about 180° F.

The particle size of the starting spray dried whole milk powder ranges from 90 to 60 microns.

A screen analysis of a typical sample of dried whole milk manufactured according to the above-described processes would be as follows:

| U.S. Sieve No. | Dry Whole Milk (Instantized) (Percent retained on sieve) |
|---|---|
| 30 | .1 |
| 40 | 1.6 |
| 50 | 13.6 |
| 70 | 39.9 |
| 100 | 43.4 |
| 140 | .6 |
| 200 | |
| Pan | .8 |

Malted milk powder made by combining whole milk with the liquid separated from a mash of ground barley malt and wheat flour so as to secure the enzymic action of the malt extract and then drying to reduce the moisture content to no more than 3.5% is a product characterized by its finely divided particle form and shape and its resistance to wetting. When conventional malted milk powder is dry blended with a predetermined amount of lecithin and the resulting mixture is instantized in the treatment apparatus in the manner previously described, the resulting product is composed of random shaped, porous aggregates of random size characterized by their ease of wettability and dispersibility in a liquid such as cold water or milk.

More specifically, an "instant" malted milk powder can be manufactured in accordance with the following procedure:

¾ lb. to 2¼ lbs. of commercial lecithin is placed in a ribbon blender with 150 lbs. of natural flavored malted milk powder and the resulting mixture is agitated until it appears to be completely homogeneous. It will be appreciated that the amount of lecithin added ranges from 0.5% to 1.5% by weight, 1% lecithin addition appearing to be optimum. The resulting dry mixture is then processed in the instantizing apparatus disclosed in FIG. 2 and the rate of moisture addition at the treatment zone, either from nozzle 24 and/or from steam nozzles 26, and the rate of feed of the mixture into the treatment zone are so calculated that the aggregated product being discharged upon the belt through the discharge cone contains from 2.7% to 7% moisture, this is assuming the the malted milk powder starting material had an initial moisture of on or about 1%. The finished drying procedure can be that described with reference to dried whole milk.

The final product has the following sieve analysis:

| U.S. Sieve No. | Natural Flavor Malted Milk (Instantized) (Percent retained on sieve) |
|---|---|
| 30 | 7.0 |
| 40 | 16.0 |
| 60 | 50.5 |
| 80 | 24.5 |
| 100 | 2.0 |
| 200 | |
| Pan | |

A specific example for the manufacture of a chocolate flavored malted milk product could be as follows:

1.5 lbs. of lecithin is blended in a ribbon blender with 150 lbs. of chocolate flavored malted milk until the resulting mixture is completely homogeneous. The chocolate flavored malted milk has a composition of 46% malted milk, 46% sucrose, and 7% cocoa. The resulting dry mixture is then processed in the instantizing apparatus disclosed in FIG. 2 and the rate of moisture addition, either from nozzle 24 or steam nozzles 26 and the rate at which the mixture is fed into the treatment zone is so calculated that the product discharged out of the discharge cone has a total moisture content of from 2.5% to 5%, 3.2% being deemed optimum. The finished drying is preferably carried on in the manner and under the conditions described with reference to dried whole milk. A sieve analysis of this product would be as follows:

| U.S. Sieve No. | Chocolate Flavor Malted Milk (Instantized) (Percent retained on sieve) |
|---|---|
| 30 | 10.0 |
| 40 | 27.0 |
| 60 | 35.0 |
| 80 | 22.0 |
| 100 | 4.5 |
| 200 | 1.5 |
| Pan | |

While it is suggested that the lecithin is preferably blended with the starting material by either physically dry blending the two ingredients together or spraying the lecithin on the individual particles of the starting material, it will also be appreciated that the lecithin can be introduced at its proper level along with the finely atomized water discharged from nozzle 24. In other words, an emulsion of the lecithin and the "instantizing" water is highly satisfactory for effecting the principles of this invention. This lecithin emulsion is preferably made up by stirring water into lecithin containing approximately 10% of a strongly hydrophilic surfactant such as polyoxyethylene sorbitan trioleate (Tween 85). The mixing is easily accomplished in a good mixer such as a Waring blendor. The ratio of the lecithin to the water, of course, must be so calculated relative to the rate of product being processed through the apparatus that the particular amount of lecithin is applied to the product.

What is claimed is:

A process for the manufacture of a fat-containing dried dairy product which is a free-flowing granular material characterized by high wettability and dispersibility in cold water comprising the steps of introducing malted milk powder into a treatment zone; moistening the individual particles of the malted milk powder with an emulsion consisting of water and lecithin and a strongly hydrophilic surfactant, the ratio of water to lecithin in said emulsion being so calculated that the final product will contain from 0.2% to 1.5% by weight of lecithin, the emulsion causing the moistened particles to be sticky and to contact and adhere together to form random shaped aggregates while dispersed in the treatment zone, the aggregates being of a size substantially greater than the size of the powder particles; and then removing the excess moisture from said aggregates outside said treatment zone.

References Cited in the file of this patent

UNITED STATES PATENTS

| 1,202,130 | Vasey | Oct. 24, 1916 |
| 1,937,527 | Otting | Dec. 5, 1933 |
| 2,174,734 | Chuck | Oct. 3, 1939 |
| 2,392,401 | North et al. | Jan. 8, 1946 |
| 2,835,586 | Peebles | May 20, 1958 |

FOREIGN PATENTS

| 297,256 | Great Britain | Sept. 20, 1928 |